United States Patent [19]
Choe et al.

[11] Patent Number: 5,814,711
[45] Date of Patent: Sep. 29, 1998

[54] POLYMERIZATION MEDIUM TO PREPARE MULTI-BLOCK COPOLYMERS

[75] Inventors: Eui Won Choe, Randolph, N.J.; Masayuki Arai, Hofheim, Germany; Marie Borzo, Basking Ridge Township, N.J.

[73] Assignee: Hoechst Celanese Corp., Somerville, N.J.

[21] Appl. No.: 761,108

[22] Filed: Dec. 5, 1996

[51] Int. Cl.$^6$ .................................................. C08L 77/388
[52] U.S. Cl. ........................... 525/431; 524/538; 525/931
[58] Field of Search ................................... 525/431, 931; 524/538

[56] References Cited

U.S. PATENT DOCUMENTS 5,028,681  7/1991  Peters ......................................... 528/27
5,274,065  12/1993  Veith ............................................. 528/6

FOREIGN PATENT DOCUMENTS 2169912  7/1986  United Kingdom ................... 525/431

*Primary Examiner*—Ana Woodward
*Attorney, Agent, or Firm*—P. S. Kalyanaraman

[57] ABSTRACT

This invention discloses a novel process to prepare multi-block copolymers with high molecular weights from two immiscible polymer segments. In one embodiment, the two polymer segments are reacted in a solvent mixture which comprises N-methyl-2-pyrrolidinone and diglyme. Such polymers are useful for alignment layer applications in display devices.

14 Claims, No Drawings

POLYMERIZATION MEDIUM TO PREPARE MULTI-BLOCK COPOLYMERS

FIELD OF THE INVENTION

This invention generally relates to the preparation of high molecular weight multi-block copolymers. It specifically discloses a unique polymerization medium to prepare such polymers.

BACKGROUND OF THE INVENTION

Multi-block copolymers are well known in the art, and are valuable commodities commercially because of their unique structure-property relationships. They have numerous applications such as, for example, thermoplastic elastomers, elastomeric fibers, toughened thermoplastic resins, surfactants, and the like. For a general discussion of block polymers, see, for example, Kirk-Othmer *Encyclopedia of Chemical Technology*, 3rd ed., volume 6, page 808, John Wiley & Sons, New York (1979). With suitable blocks, their applications can be extended to technology articles such as, for example, alignment layers in flat panel display devices. Such devices are highly useful for high definition televisions, computer monitors, and the like. For a general discussion of flat panel displays see, for example, S. Pongratz, *R&D Magazine*, 27 (April 1994); *Encyclopedia of Physical Science and Technology*, second edition, vol. 5 (R. A. Meyers, ed.), Academic Press, New York, 710 (1992); ibid., vol. 8, 46 (1992). A very useful article on liquid crystal displays in general is provided in *Liquid Crystals- Applications and Uses*, edited by B. Bahadur, Volumes 1–3, World Scientific Publications, 1995. An article therein on pages 171–194 entitled *Materials and Assembling Process of LCDs* by S. Morozumi, describes the various layers that go into construction of the devices and materials therefor.

Multi-block copolymers may be of the miscible type or immiscible type. In the latter case, the individual polymers that form the segments are immiscible between themselves, but become covalently linked during the polymerization reaction. Such multi-block copolymers are not, in themselves, polymer mixtures, but exhibit phase structures that physically resemble polymer mixtures. While preparation of multi-block copolymers where the polymer segments comprising the segments are of the miscible type is fairly well known and easily accomplished, preparation of multi-block copolymers containing immiscible polymer segments is generally difficult and often leads to low molecular weight materials instead.

Several attempts have been made in the past to achieve synthesis of high molecular weight multi-block copolymers containing immiscible polymeric segments. Thus, for example, K. Kajiyama et al, *Polymer Journal*, Vol. 18, 735–740 (1986) report the preparation of multi-block copolymers from two immiscible polymer segments, namely a wholly aromatic polyamide segment and a polydimethylsiloxane segment. An amine-terminated polydimethylsiloxane and a carboxy-terminated aramid were condensed in pyridine as the solvent. The polymers obtained were described as having a "rather low molecular weight", with I.V. ($\eta_{inh}$) in the range 0.21–0.41 dL/g when measured in dimethylacetamide ("DMAc") at a concentration of 0.5 g $dl^{-1}$ at 30° C. Kakimoto et al, *Polymer Journal*, Vol. 18, 935–940 (1986) report the preparation of such multi-block copolymers from carboxy-terminated polydimethylsiloxane and an amine-terminated aramid in a medium comprising pyridine and dioxane. Again, the polymers had low molecular weight, with $\eta_{inh}$ of about 0.13–0.25 dL/g when measured under the same conditions.

M. Kajiyama et al, *Macromolecules*, Vol. 22 (11), 4143 (1989) report the preparation of block copolymers based on polydimethylsiloxane ("PDMS") and aramids, by solution polycondensation of a,w-diacid chloride-terminated aramid with a,w-bisaminopropyl-terminated polydimethylsiloxane in chloroform and triethylamine. When the aramid was based on 3,4'-oxydianiline ("3,4'-ODA"), the multi-block copolymers had I.V.s ranging from 0.17 to 0.47 dL/g in DMAc, when measured at a concentration of 0.5 g $dl^{-1}$ at 30° C. When the aramid was based on 4,4'-oxydianiline ("4,4'-ODA"), the multi-block copolymers had I.V.s ranging from 0.19 to 0.87 dL/g in DMAc, when measured at a concentration of 0.5 g $dl^{-1}$ at 30° C. However, those polymers tended to have high incorporation of the polydimethylsiloxane segment.

Other workers have reported the preparation of multi-block copolymers composed of aramids and polydimethylsiloxanes by solution polymerization of isophthaloyl dichloride with 3,4'-oxydianiline and a,w-bisaminopropyl terminated polydimethylsiloxane in chloroform in the presence of triethylamine hydrochloride, resulting in only low molecular weight multi-block copolymers having I.V.s less than 0.47 dL/g in DMAc (<0.37 dL/g in hexafluoroisopropanol/ pentafluorophenol, "HFIP/PFP"), or by a direct polycondensation of isophthalic acid, with 3,4'-oxydianiline and a,w-bisaminopropyl terminated polydimethylsiloxanes using triphenyl phosphite and pyridine as condensing agents also resulting in low inherent viscosities in the range from 0.13 to 0.41 dL/g (DMAc). Other solvent systems that have been used for the polymerization reaction are triethylamine, chloroform and diglyme by themselves or in combination with pyridine, triethylamine and dioxane, again with low molecular weight polymers resulting. The utility of the resulting polymers gets severely restricted if the polymer has such low molecular weights.

Materials used for alignment layer applications in display systems possess critical properties such as, for example, high temperature stability, compatibility with the other layers, spin coatability and the like. Currently the materials used for such applications are polymers such as polyimides, nylon and the like. Any material which replaces these polymers should have similar properties. A polymer with a high polydimethylsiloxane, for example, is unlikely to possess such suitable properties.

Thus, it is an object of this invention to provide a process to prepare multi-block copolymers with high molecular weights, namely, molecular weights as expressed by $\eta_{inh}$ of 0.45 dL/g or more in a consistent manner when measured in DMAc at a concentration of 0.5 g $dl^{-1}$ at 30° C., or a $\eta_{inh}$ of 0.5 dL/g or more when measured in HFIP/PFP (50/50) at a concentration of 0.1 g $dl^{-1}$ at 25° C.

It is an additional object of this invention to provide a process to prepare high molecular weight multi-block copolymers comprising immiscible polymer segments.

It is a further object of this invention to provide a process to prepare high molecular weight copolymers comprising wholly aromatic polyamide segments and polydimethylsiloxane segments.

It is yet another object of this invention to provide a process to prepare high molecular weight copolymers comprising wholly aromatic polyamide segments and polydimethylsiloxane segments wherein the polydimethylsiloxane segments constitute 20 mole percent or less in the copolymer.

It is still another object of this invention to provide a process to prepare polymers suitable for alignment layer applications.

Other objects and advantages of the present invention will be apparent from the accompanying description and examples.

SUMMARY OF THE INVENTION

One or more of the foregoing objects are achieved by the provision of the inventive process to prepare multi-block copolymers. The process comprises: reacting, for about 1–20 hours at about −20° to 40° C. with optional agitation, a first polymer segment containing a first set of reactive end groups with a second polymer segment containing a second set of reactive end groups, in a solvent mixture which comprises a first solvent selected from the group consisting of N-methyl-2-pyrrolidinone ("NMP"), N,N-dimethylformamide ("DMF"), N,N-dimethylacetamide ("DMAc"), and N,N.N'N'-tetramethylurea ("TMU"), and a second solvent selected from the group consisting of diglyme ("DG"), tetrahydrofuran ("THF"), a crown ether and tetrahydropyran ("THP") in a 20:80 to 80:20 volume/ volume ratio, wherein said first polymer segment and said second polymer segment are immiscible, and further wherein said first set of reactive end groups and said second set of reactive end groups are capable of reacting with each other in said solvent mixture. In a preferred approach, the process comprises: (a) bringing into intimate contact a first polymeric material containing a first set of reactive end groups with a solvent mixture wherein the solvent mixture comprises a first solvent selected from the group consisting of NMP, DMF, DMAc and TMU, and a second solvent selected from the group consisting of DG, THF, a crown ether and THP in a 20:80 to 80:20 volume/ volume ratio; (b) adding a second polymeric material containing a second set of reactive end groups to (a); and (c) maintaining the entire mixture in intimate contact, optionally with agitation, for about 1–20 hours at about −20° to 40° C. to yield the desired multi-block copolymer. The individual polymeric segments may be pre-formed, or prepared in situ. The unique solvent mixture facilitates the polymerization reaction to proceed to yield high molecular weight multi-block polymers, as opposed to traditional solvent mediums for preparing such polymers. The process is particularly suitable for preparing high molecular weight polymers containing immiscible polymer segments. The term "high molecular weight" refers to molecular weights as expressed by $\eta_{inh}$ of 0.45 or more when measured in DMAc at a concentration of 0.5 g dl$^{-1}$ at 30° C. or a $\eta_{inh}$ of 0.45 dL/g or more when measured in HFIP/PFP (50/50) at a concentration of 0.5 g dl$^{-1}$ at 25° C. While the ratio of the first solvent to the second solvent is generally in the range 20:80 to 80:20, the preferred ratio range is 30:70 to 70:30, and the typical range is 40:60 to 60:40. The concentration of the entire mixture in the solvent medium during step (c) of the polymerization reaction is 5% or more.

An illustrative multi-block copolymer is one prepared from a wholly aromatic polyamide containing carboxy end groups such as, for example, carbonyl halide end groups, and a polydimethylsiloxane ("PDMS") containing amine end groups in a solvent system comprising NMP and diglyme, or NMP and THF. The process yields multiblock copolymers which have a $\eta_{inh}$ of 0.45 or more when measured in DMAc at a concentration of 0.5 g dl$^{-1}$ at 30° C., or 0.5 or more when measured in HFIP/PFP (50/50) at a concentration of 0.1 g dl$^{-1}$ at 25° C. Furthermore, they also contain an incorporation of PDMS of 20 mole percent or less.

DESCRIPTION OF THE INVENTION

In one embodiment, this invention describes a novel process for the production of multi-block copolymers that are composed of two immiscible polymer segments. When the two polymer segments are immiscible in each other; the preparation of multi-block copolymers having high molecular weights from such segments is generally difficult. The inventive process describes a convenient method for the preparation of high molecular weight multi-block copolymers from such polymer segments by employing a unique polymerization medium. The unique polymerization medium is a solvent mixture which comprises a first solvent selected from the group consisting of NMP, DMF, TMP and DMAc, and a second solvent selected from the group consisting of DG, THF, a crown ether and THP at ratios ranging from 20:80 to 80:20. The most preferred ratio of the first solvent to the second solvent is 40:60 to 60:40. While the minimum concentration of the polymeric segments in the polymerization medium during the reaction is 5 weight percent, preferred concentrations are 10% and above, while the most preferred polymerization concentration is about 25% or greater. The invention is illustrated by the multi-block copolymers prepared from wholly aromatic polyamides and polydimethylsiloxanes with various chain lengths at several aramid/siloxane ratios. The polyamide segments carry carboxyl end groups and the polysiloxane segments carry amine end groups. The invention is equally applicable to cases where the polyamide carries the amine end groups and the polysiloxane carries the carboxyl ends. The term "carboxy end groups" herein refers to end groups that are capable of reacting with the amine end groups such as, for example, carbonyl chloride (also referred to as chloroformate), carbonyl bromide and the like. The inventive process consistently yields such segment-containing multi-block copolymers with $\eta_{inh}$ of 0.45 or more when measured in DMAc at a concentration of 0.5 g dl$^{-1}$ at 30° C., and with the siloxane segment content equal to, or less than, 20 mole %.

For the illustrative preparation, the appropriate wholly aromatic polyamides with the appropriate end groups may be available commercially, or preferably may be prepared. If they are prepared, they may be prepared from 3,4'-oxydianiline (or 4,4'-oxydianiline) and isophthaloyl dichloride, with the resulting end groups being acid chloride groups. The diamine terminated polydimethylsiloxanes are available commercially from Shin-Etsu Chemical Co. Ltd., Tokyo, Japan, with number average molecular weights ($M_n$) ranging from 250 to 3000, or they may be prepared by methods known in the literature. While the inventive process is applicable to all molecular weight ranges of the siloxane, it has been found that the preferred molecular weight for the PDMS segment in order to yield high molecular weight multi-block copolymers with low enough PDMS content is about 1680. The general structure of a multi-block copolymer derived from isophthaloyl dichloride, 3,4'-oxydianiline and a,w-bisaminopropyl PDMS is shown in FIG. 1:

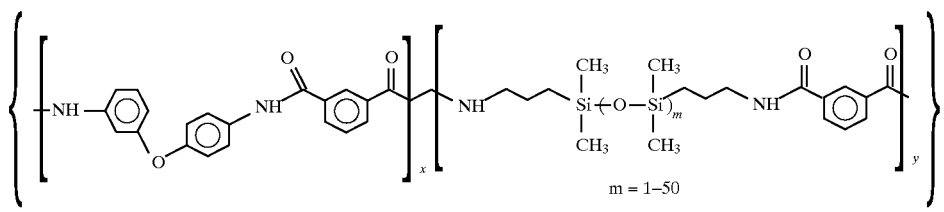

where x+y total 100 mole percent, x refers to the mole percent of the polyamide segment, y refers to the mole percent of the PDMS segment, and m refers to the number of repeating dimethylsiloxane units in the PDMS.

The illustrative multi-block copolymer is prepared as follows. The polyamide segment containing the carboxy end groups is prepared from 3,4'-oxydianiline ("3,4'-ODA") and isophthaloyl chloride ("IDC"). Thus, 3,4'-ODA is taken in the preferred solvent system stated above such as, for example, a mixture of NMP and diglyme in a 50:50 ratio, in a suitable apparatus equipped with a thermometer, mechanical stirrer, inert atmosphere and cooling bath. It generally dissolves within a few minutes. The solution is kept, preferably with agitation, generally at a temperature of about −20° to 40° C., preferably at about −15° to about 15° C., and typically at about −10° to 0° C. To the solution, isophthaloyl chloride is added in a slight excess compared to the ODA in order to result in a polyamide containing—COCl end groups. After stirring for another time period ranging generally from 1–60 minutes, preferably from 1–30 minutes and typically from 1–10 minutes, PDMS is added to the contents of the reaction vessel. The total concentration is generally kept at 5 weight percent or above. The polymer segments are allowed to polymerize over the time period stated previously at the stated temperatures, most preferably by allowing the reaction mixture to warm up to ambient temperature and stirring thereat.

The work-up of the reaction may be performed by methods well known to those skilled in the art. In one method, the contents are diluted with a nonsolvent such as, for example, water, methanol and the like, whereupon the desired multi-block copolymer precipitates. The product may be isolated by known methods such as, for example, filtration, washing and drying at a suitable temperature in vacuo.

Characterization of the multi-block copolymer may be performed by techniques well known to those skilled in the art such as, for example, measurement of the I.V., GPC, NMR, $T_g$ and the like. The aramid/siloxane ratio is calculated from the NMR data. Certain general conclusions could be made in a typical preparation. Thus, for example, in preparations using PDMS of $M_n$ 1680, I.V.s greater than 0.6 were obtained, whereas when the $M_n$ of PDMS was 915 or lower, lower I.V.s were obtained for the resulting multi-block copolymers. 20 mole Percent or less molar incorporation of the siloxane segment could be easily obtained thus enhancing the utility of these copolymers for alignment layers in displays.

In a similar manner, polyamides containing 4,4'-oxydianiline ("4,4'-ODA") and acid chloride end groups could also be reacted with amine-terminated PDMS polymers to get the appropriate multi-block copolymers.

By providing a unique solvent medium ("polymerization medium"), namely the solvent mixture which comprises a first solvent selected from the group consisting of NMP, DMF, and DMAc, and a second solvent selected from the group consisting of DG, THF, a crown ether and THP, this invention surprisingly offers the advantage of preparing multi-block copolymers with high I.V.s, especially when the polymer segments are immiscible. If the polymer segments are polyamide and polydimethylsiloxane, this invention also offers the unique advantage of lower molar incorporation of the siloxane segment in the multi-block copolymer.

The inventive process may be equally applicable to prepare multiblock copolymers from miscible polymer segments also.

The multi-block copolymers as taught by this invention have utility in many applications where such polymers are generally used. A particular application is as material for alignment layers in flat panel liquid crystal display devices. Such devices generally contain many layers including, for example, a substrate, a polarizing layer, an adhesive layer, an alignment layer for a liquid crystal material, and the like. Generally the alignment layer is a polyimide, a nylon and the like, which is generally rubbed on a substrate. For a general discussion of rubbing and disadvantages thereof, see the above-mentioned article by S. Morozumi on page 184 et seq. The inventive multi-block copolymers not only possess the characteristics necessary for a good alignment layer but also may not need rubbing, and for that reason may be preferred for such an application. Thus, a useful illustrative flat panel display device may comprise a suitable polarizer film (such as, for example, that described in pending application Ser. No. 08/560,488, filed Jun. 2, 1995), a suitable substrate (such as, for example, glass, indium-tin-oxide and the like), the inventive multi-block polymeric alignment layer, and a ferroelectric crystal.

The following Examples are provided to further illustrate the present invention, but should not be construed as limiting the scope of this invention.

EXAMPLES

In the following Examples, "ambient temperature" refers to temperatures in the range 23°–28° C. The PDMS materials are available from Shin-Etsu Chemical Co. Ltd., 6-1, Ohtemachi 2-Chrome, Chiyoda-Ku, Tokyo, Japan.

Example 1.

Preparation of poly[3,4'-oxybiphenylene-isophthalamide-b-a,w-bispropyl-poly(dimethylsiloxane)-isophthalamide] using average siloxane Mn 1680 in 50:50 NMP/DG at a 10% polymerization concentration In a 500 ml. three-necked resin flask equipped with a nitrogen inlet and outlet, thermometer, and mechanical stirrer, were placed 10.91 grams (54.5 mmol) of 3,4'-oxydianiline and 140 ml of a 50:50 mixture of NMP and diglyme. The mixture was cooled to −9° C. To the cooled solution, was added 11.29 grams (55.61 mmol) of isophthaloyl dichloride. The trace of remaining dichloride in the IDC container was transferred into the flask by rinsing it with 20 ml. of the mixture of NMP and diglyme. After five minutes stirring, a,w-diaminopropyl-polydimethylsiloxane (1.85 grams, 1.12 mmol, with a number average molecular weight of 1680, available from Shin-Etsu Chemical Co. Ltd.) was added into the flask. The temperature of the resulting mixture was allowed to slowly rise to ambient temperature. The resulting reaction mixture was stirred for 16 hours at ambient temperature, and then poured into water to precipitate the polymer. The polymer was filtered and washed successively with water, acetone, and then hexane, and dried at 100° C. for 16 hours and 1 Torr to obtain 15.35 grams of poly[3,4'-oxybiphenylene-isophthalamide-b-a,w-bispropyl-poly (dimethylsiloxane)-isophthalamide]; I.V. 0.72 dL/g as determined at 25° C. and 0.1% concentration in HFIP/PFP 50/50; I.V. 0.52 dL/g as determined at 30° C. and 0.5% concentration in DMAc; Tgs 62 and 240° C., aramid/siloxane molar ratio as determined by NMR 99.53/0.47. The PDMS content is thus less than 0.5 mole percent.

Example 2

Preparation of poly[3,4'-oxybiphenylene-isophthalamide-b-a,w-bispropyl-poly (dimethylsiloxane)-isophthalamide]using Average siloxane Mn 1680 in 30:70 NMP/DG at a 10% polymer concentration In a 500 ml. three-necked resin flask equipped with a nitrogen inlet and outlet, thermometer, and mechanical stirrer, were placed 9.82 grams (49.04 mmol) of 3,4'-oxydianiline and 130 ml of a 30:70 mixture of NMP and diglyme. The mixture was cooled to −9° C. To the cooled solution, was added 10.16 grams (50.0 mmol) of isophthaloyl dichloride. The trace of remaining dichloride in the IDC container was transferred into the flask by rinsing it with 15 ml. of the mixture of NMP and diglyme. After five minutes stirring, a,w-diaminopropyl-polydimethylsiloxane (1.67 grams, 0.997 mmol) with an average molecular weight of 1680 was added into the flask. The temperature of the resulting mixture was allowed to slowly rise to ambient temperature. The resulting reaction mixture was stirred for 16 hours, and then poured into water to precipitate the polymer. The polymer was filtered and washed successively with water, acetone, and then hexane, and dried at 100° C. for 16 hours and 1 Torr to obtain 15.07 grams of poly[3,4'-oxybiphenylene-isophthalamide-b-a,w-bispropyl-poly (dimethylsiloxane)-isophthalamide]; I.V. 0.60 dL/g as determined at 25° C. and 0.1% concentration in HFIP/PFP 50/50; I.V. 0.45 dL/g as determined at 30° C and 0.5% concentration in DMAc; Tgs 55° and 239° C., aramid/siloxane molar ratio as determined by NMR 99.57/0.43.

Example 3

Preparation of poly[3,4'-oxybiphenylene-isophthalamideb-a,w-bispropyl-poly (dimethylsiloxane)-isophthalamide] using Average siloxane Mn 1680 in 10:90 NMP/DG at a 10 % polymer concentration In a 500 ml. three-necked resin flask equipped with nitrogen inlet and outlet, thermometer, and mechanical stirrer, were placed 10.91 grams (54.5 mmol) of 3,4'-oxydianiline and 140 ml of a 10:90 mixture of NMP and diglyme. The mixture was cooled to −9° C. To the cooled solution, was added 11.29 grams (55.61 mmol) of isophthaloyl dichloride. The trace of remaining dichloride in the IDC container was transferred into the flask by rinsing it with 20 ml. of the mixture of NMP and diglyme. The aramid precipitated out of the reaction medium as soon as the dichloride was added. Under the same conditions as Example 1, i.e. after five minutes stirring, a,w-diaminopropyl-polydimethylsiloxane (1.85 grams, 1.12 mmol) with an average molecular weight of 1680 was added into the flask. The temperature of the resulting mixture was allowed to slowly rise to ambient temperature. The resulting reaction mixture was stirred 16 hours, and poured into water to precipitate the polymer. The polymer was filtered and washed successively with water, acetone, and then hexane, and dried at 100° C. for 16 hours and 1 Torr to obtain 15.14 grams of substantially the multi-block copolymer, poly[3,4'-oxybiphenylene-isophthalamide-b-a,w-bispropyl-poly (dimethylsiloxane)-isophthalamide]; I.V. 1.24 dL/g as determined at 25° C. and 0.1% concentration in HFIP/PFP 50/50; I.V. 0.95 dL/g as determined at 30° C. and 0.5% concentration in DMAc; Tgs 65° and 242° C.

Example 4

Preparation of poly[3,4'-oxybiphenylene-isophthalamideb-a,w-bispropyl-poly (dimethylsiloxane)-isophthalamide] using siloxane Mn 250 in 50:50 NMP/DG at a 10% polymerization concentration In a 500 ml. three-necked resin flask equipped with nitrogen inlet and outlet, thermometer, and mechanical stirrer, were placed 10.91 grams (54.5 mmol) of 3,4'-oxydianiline and 140 ml of a 50:50 mixture of NMP and diglyme. The mixture was cooled to −9° C. To the cooled solution, was added 12.13 grams (59.75 mmol) of isophthaloyl dichloride. The trace of remaining dichloride in the IDC container was transferred into the flask by rinsing it with 20 ml of the mixture of NMP and diglyme. After five minutes stirring, a,w-bisaminopropyl-tetramethyldisiloxane (1.32 grams, 5.26 mmol) with an average molecular weight of 250 was added into the flask. The temperature of the resulting mixture was allowed to rise to ambient temperature. The resulting reaction mixture was stirred for 16 hours, and poured into water to precipitate the polymer. The polymer was filtered and washed successively with water, acetone, and then hexane, and dried at 100° C. for 16 hours and 1 Torr to obtain 11.19 grams of poly[3,4'-oxybiphenylene-isophthalamide-ba,w-bispropyl-tetramethyldisiloxane)-isophthalamide-b-a,w-bispropyl-tetramethyldisiloxane)-isophthalamide]; I.V. 0.52 dL/g as determined at 25° C. and 0.1% concentration in HFIP/PFP 50/50; I.V. 0.20 dL/g as determined at 30° C. and 0.5% concentration in DMAc; Tgs 60 and 226° C., aramid/siloxane molar ratio as determined by NMR 99.13/0.87.

Example 5

Preparation of poly[3,4'-oxybiphenylene-isophthalamideb-a,w-bispropyl-poly (dimethylsiloxane)-isophthalamide] using Average siloxane Mn 915 in 50:50 NMP/DG at a 10% polymerization concentration In a 500 ml. three-necked resin flask equipped with nitrogen inlet and outlet, thermometer, and mechanical stirrer, were placed 10.91 grams (54.5 mmol) of 3,4'-oxydianiline and 140 ml of a 50:50 mixture of NMP and diglyme. The mixture was cooled to −9° C. To the cooled solution, was added 11.45 grams (56.38 mmol) of isophthaloyl dichloride. The trace of remaining dichloride in the IDC container was transferred into the flask by rinsing it with 20 ml. of the mixture of NMP and diglyme. After five minutes stirring, a,w-diamininopropyl-polydimethylsiloxane (1.75 grams, 1.89 mmol) with an average molecular weight of 915 was added into the flask. The temperature of the resulting mixture was allowed to slowly rise to ambient temperature. The resulting reaction mixture was stirred for 16 hours at ambient temperature, and poured into water to precipitate the polymer. The polymer was filtered and washed successively with water, acetone, and then hexane, and dried at 100° C. for 16 hours and 1 Torr to obtain 16.19 grams of poly[3,4'-oxybiphenylene-isophthalamide-b-a,w-bispropyl-poly(dimethylsiloxane)-isophthalamide]; I.V. 0.28 dL/g as determined at 25° C. and 0.1% concentration in HFIP/PFP 50/50; I.V. 0.38 dL/g as determined at 30° C. and 0.5% concentration in DMAc; Tgs 64° and 236° C., aramid/siloxane molar ratio as determined by NMR 99.43/0.57.

Examples 6–8

Effect of increasing the concentration during polymerization; Preparation of poly[3,4'-oxybiphenylene-isophthalamide-b-a,w-bispropyl-poly(dimethylsiloxane)-isophthalamide] with Average siloxane Mn 1680 in 50:50 NMP/DG at various polymer concentrations Poly[3,4'-oxybiphenylene-isophthalamide-b-a,w-bispropyl-poly(dimethylsiloxane)-isophthalamide]s were prepared in accordance with Example 1, except that the polymer concentration was varied as indicated in the following Table 1. The polymer concentration refers to solid content after both polymer segments are added to the solvent medium. Table 1 demonstrates that higher siloxane content is incorporated into the multi-block copolymer as the polymer concentration is increased from 10 to 25 weight percent. The 10 weight % example is Example 1, for comparison. Example 8, with 25 weight % concentration is described in detail below. (I.V. 0.50 dL/g as determined at 30° C. and 0.5% concentration in DMAc in Example 6; I.V. 0.54 dL/g as determined at 30° C. and 0.5% concentration in DMAc in Example 7).

TABLE 1

| Example No. | Polymer concentration during the preparation | I.V. dL/g (HFIP/PFP) | Molar ratio of aramid/siloxane polymer by NMR |
| --- | --- | --- | --- |
| 1 | 10 | 0.72 | 99.53/0.47 |
| 6 | 15 | 0.68 | 99.5/0.5 |
| 7 | 20 | 0.73 | 99.5/0.5 |
| 8 | 25 | 0.82 | 99.1/0.9 |

Example 8

Preparation of poly[3,4'-oxybiphenylene-isophthalamide-b-a,w-bispropyl-poly(dimethylsiloxane)-isophthalamide] using Average siloxane Mn 1680 in 50:50 NMP/DG at 25% polymer concentration In a 500 ml. three-necked resin flask equipped with nitrogen inlet and outlet, thermometer, and mechanical stirrer, were placed 21.82 grams (108.98 mmol) of 3,4'-oxydianiline and 90 ml of a 50:50 mixture of NMP and diglyme. The mixture was cooled to –15° C. To the cooled solution, was added 22.58 grams (111.2 mmol) of isophthaloyl dichloride. The trace of remaining dichloride in the IDC container was transferred into the flask by rinsing it with 15 ml. of the mixture of NMP and diglyme. After five minutes stirring, a,w-diamininopropyl-polydimethylsiloxane (3.75 grams, 2.24 mmol) with an average molecular weight of 1680 was added into the flask. The temperature of the resulting mixture was allowed to slowly rise to ambient temperature. The resulting reaction mixture was stirred for 16 hours at ambient temperature, and then poured into water to precipitate the polymer. The polymer was filtered and washed successively with water, acetone, and then hexane, and dried at 100° C. for 16 hours and 1 Torr to obtain 37.44 grams of poly[3,4'-oxybiphenylene-isophthalamide-b-a,w-bispropylpoly(dimethylsiloxane)-isophthalamide]; I.V. 0.82 dL/g as determined at 25° C. and 0.1% concentration in HFIP/PFP 50/50; I.V. 0.63 dL/g as determined at 30° C and 0.5% concentration in DMAc; Tgs 41° and 241° C., aramid/siloxane molar ratio as determined by NMR 99.1/0.9.

Example 9

Preparation of poly[3,4'-oxybiphenylene-isophthalamideb-a,w-bispropyl-poly(dimethylsiloxane)-isophthalamide]using Average siloxane Mn 1680 in 45:55 THF/NMP This polymer was prepared in accordance with Example 1 except that the solvent was replaced with a 55:45 mixture of THF and NMP to obtain the polymer with similar properties.

Example 10

Preparation of poly[4,4'-oxybiphenylene-isophthalamide-b-a,w-bispropyl-poly(dimethylsiloxane)-isophthalamide]using Average siloxane Mn 1680 in 50:50 NMP/DG at a 10% polymerization concentration:

In a 500 ml. three-necked resin flask equipped with a nitrogen inlet and outlet, thermometer, and mechanical stirrer, were placed 10.91 grams (54.5 mmol) of 4,4'-oxydianiline and 140 ml of a 50:50 mixture of NMP and diglyme. The mixture was cooled to –9° C. To the cooled solution, was added 11.29 grams (55.61 mmol) of isophthaloyl Dichloride. The trace of remaining dichloride in the IDC container was transferred into the flask by rinsing it with 20 ml. of the mixture of NMP and diglyme. After five minutes stirring, a,w-diaminopropyl-polydimethylsiloxane (1.85 grams, 1.12 mmol, with a number average molecular weight of 1680, available from Shin-Etsu Chemical Co. Ltd.) was added into the flask. The temperature of the resulting mixture was allowed to slowly rise to ambient temperature. The resulting reaction mixture was stirred for 16 hours at ambient temperature, and then poured into water to precipitate the polymer. The polymer was filtered and washed successively with water, acetone, and then hexane, and dried at 100° C. for 16 hours and 1 Torr to obtain 14 grams of poly[4,4'-oxybiphenylene-isophthalamide-b-a,w-bispropyl-poly(dimethylsiloxane)-isophthalamide]; I.V. 0.76 dL/g as determined at 25° C. and 0.1% concentration in HFIP/PFP 50/50; I.V. 0.57 dL/g as determined at 30° C. and 0.5% concentration in DMAc; Tgs 79° and 259° C., aramid/siloxane molar ratio as determined by NMR 99.5/0.5.

Example 11

Preparation of poly[4,4'-oxybiphenylene-isophthalamideb-a,w-bispropyl-poly(dimethylsiloxane)-isophthalamide] using Average siloxane Mn 1680 in 50:50 NMP/DG at 25% polymer concentration In a 500 ml. three-necked resin flask equipped with nitrogen inlet and outlet, thermometer, and mechanical stirrer, were placed 21.82 grams (108.98 mmol) of 4,4'-oxydianiline and 90 ml of a 50:50 mixture of NMP and diglyme. The mixture was cooled to −15° C. To the cooled solution, was added 22.58 grams (111.2 mmol) of isophthaloyl dichloride. The trace of remaining dichloride in the IDC container was transferred into the flask by rinsing it with 15 ml. of the mixture of NMP and diglyme. After five minutes stirring, a,w-diamininopropyl-polydimethylsiloxane (3.75 grams, 2.24 mmol) with an average molecular weight of 1680 was added into the flask. The temperature of the resulting mixture was allowed to slowly rise to ambient temperature. The resulting reaction mixture was stirred for 16 hours at ambient temperature, and then poured into water to precipitate the polymer. The polymer was filtered and washed successively with water, acetone, and then hexane, and dried at 100° C. for 16 hours and 1 Torr to obtain 37.5 grams of poly[4,4'-oxybiphenylene-isophthalamide-b-a,w-bispropylpoly(dimethylsiloxane)-isophthalamide]; I.V. 0.88 dL/g as determined at 25° C. and 0.1% concentration in HFIP/PFP 50/50; I.V. 0.69 dL/g as determined at 30° C. and 0.5% concentration in DMAC; Tgs 84° and 254° C., aramid/siloxane molar ratio as determined by NMR 99.5/0.5.

What is claimed is:

1. A process to prepare a multi-block copolymer comprising a wholly aromatic polyamide and a polydimethylsiloxane wherein said copolymer has an $\eta_{inh}$ of 0.45 or more when measured in N,N-dimethylacetamide at a concentration of 0.5 g dl$^{-1}$ at 30° C., the process comprising: reacting, for about 1–20 hours at about −20° to 40° C. with optional agitation, a wholly aromatic polyamide segment containing a first set of reactive end groups with a polydimethylsiloxane segment containing a second set of reactive end groups, in a solvent mixture which comprises a first solvent selected from the group consisting of N-methyl-2-pyrrolidinone, N,N-dimethylformamide, N,N-dimethylacetamide, and N,N.N'N'-tetramethylurea, and a second solvent selected from the group consisting of diglyme, tetrahydrofuran, a crown ether and tetrahydropyran in a 20:80 to 80:20 volume/volume ratio, wherein said first set of reactive end groups and said second set of reactive end groups are capable of reacting with each other in said solvent mixture.

2. The process as described in claim 1, wherein said first set of reactive end groups is carboxy group, and said second set of reactive end groups is amine.

3. The process as described in claim 1, wherein said first set of reactive end groups is amine, and said second set of reactive end groups is carboxy group.

4. The process as described in claim 2 or 3, wherein said polydimethylsiloxane segment in said multi-block copolymer is not more than mole percent.

5. The process as described in claim 2 or 3, wherein said polydimethylsiloxane segment in said multi-block copolymer is not more than mole percent.

6. The process as described in claim 1, wherein said solvent mixture comprises N-methyl-2-pyrrolidinone and diglyme in a 30:70 to 70:30 volume/ volume ratio range.

7. The process as described in claim 1, wherein said solvent mixture comprises N-methyl-2-pyrrolidinone and diglyme in a 50:50 volume/volume ratio.

8. The process as described in claim 1, wherein said solvent mixture comprises N-methyl-2-pyrrolidinone and tetrahydrofuran in a 30:70 to 70:30 volume/volume ratio.

9. The process as described in claim 1, wherein said reaction is performed at a concentration of at least 5 weight percent in said solvent mixture.

10. The process as described in claim 1, wherein said reaction is performed at a concentration of at least 10 weight percent in said solvent mixture.

11. The process as described in claim 1, wherein said reaction is performed at about −20° C. to about 0° C.

12. A process to prepare a multi-block copolymer of a wholly aromatic polyamide and a polydimethylsiloxane wherein said copolymer has an $\eta_{inh}$ of 0.45 or more when measured in N,N-dimethylacetamide at a concentration of 0.5 g dl$^{-1}$ at 30° C., and further wherein said copolymer has a polydimethylsiloxane content under 20 mole percent, the process comprising (a) bringing into intimate contact a wholly aromatic polyamide containing suitable reactive end groups and a solvent medium comprising N-methyl-2-pyrrolidinone and diglyme in a 20:80 to 80:20 volume/volume ratio; (b) adding a polydimethylsiloxane containing reactive end groups suitable to react with the end groups of said polyamide, to form a mixture; and (c) maintaining said mixture, with optional agitation, for about 1–20 hours at about −20° to 40° C. to yield the multi-block copolymer.

13. The process as described in claim 12, wherein said reactive end groups on said polyamide are carboxyl and said reactive end groups on said polydimethylsiloxane are amine.

14. The process as described in claim 12, wherein said reactive end groups on said polyamide are amine and said reactive end groups on said polydimethylsiloxane are carboxyl.

* * * * *